US010869357B2

(12) United States Patent
Lee et al.

(10) Patent No.: US 10,869,357 B2
(45) Date of Patent: Dec. 15, 2020

(54) METHOD FOR CONFIGURING DISCONTINUOUS RECEPTION IN A COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 16/088,045

(22) PCT Filed: Mar. 23, 2017

(86) PCT No.: PCT/KR2017/003131
§ 371 (c)(1),
(2) Date: Sep. 24, 2018

(87) PCT Pub. No.: WO2017/164667
PCT Pub. Date: Sep. 28, 2017

(65) Prior Publication Data
US 2020/0137822 A1    Apr. 30, 2020

Related U.S. Application Data

(60) Provisional application No. 62/312,478, filed on Mar. 24, 2016.

(51) Int. Cl.
*H04W 76/28*        (2018.01)
*H04W 72/04*        (2009.01)
(Continued)

(52) U.S. Cl.
CPC ......... *H04W 76/28* (2018.02); *H04W 72/042* (2013.01); *H04W 72/1268* (2013.01); *H04W 80/02* (2013.01)

(58) Field of Classification Search
CPC ............... H04W 76/28; H04W 72/042; H04W 72/1268; H04W 80/02
See application file for complete search history.

(56) References Cited

U.S. PATENT DOCUMENTS

| 2007/0153739 A1* | 7/2007 | Zheng | H04W 12/08 |
| | | | 370/331 |
| 2007/0153749 A1* | 7/2007 | Waxman | H04W 16/14 |
| | | | 370/338 |

(Continued)

FOREIGN PATENT DOCUMENTS

| WO | 2009114802 | 9/2009 |
| WO | 2015108455 | 7/2015 |

OTHER PUBLICATIONS

European Patent Office Application Serial No. 17770637.1, Search Report dated Sep. 4, 2019, 9 pages.

(Continued)

*Primary Examiner* — Chi Ho A Lee
(74) *Attorney, Agent, or Firm* — Lee Hong Degerman Kang Waimey (57) ABSTRACT

The present invention relates to a wireless communication system. More specifically, the present invention relates to a method and a device for configuring DRX in a wireless communication system. According to an aspect of the present invention, the method comprising: setting a timer for DL to a first value and a timer for UL to a second value based on DRX configuration information received from a BS, wherein the timer for DL is used for determining DL data transmission inactivity, and the timer for UL is used for determining UL data transmission inactivity; receiving a scheduling control channel in an active time; starting or restarting the timer for DL or the timer for UL based on (Continued)

whether the scheduling control channel indicates a new transmission in downlink or a new transmission in uplink.

12 Claims, 8 Drawing Sheets

(51) Int. Cl.
*H04W 72/12* (2009.01)
*H04W 80/02* (2009.01)

(56) References Cited

U.S. PATENT DOCUMENTS

| | | | | |
|---|---|---|---|---|
| 2010/0020755 | A1* | 1/2010 | Tseng | H04W 76/28 370/329 |
| 2013/0163497 | A1* | 6/2013 | Wei | H04L 5/0007 370/311 |
| 2013/0223311 | A1 | 8/2013 | Wang et al. | |
| 2014/0086110 | A1 | 3/2014 | Lee et al. | |
| 2014/0369245 | A1* | 12/2014 | Pecen | H04W 52/0212 370/311 |
| 2016/0044541 | A1* | 2/2016 | Lunden | H04W 48/20 370/252 |
| 2016/0119969 | A1* | 4/2016 | Vajapeyam | H04W 24/10 370/329 |
| 2016/0294531 | A1* | 10/2016 | Loehr | H04W 76/28 |
| 2016/0366722 | A1* | 12/2016 | Heo | H04L 65/602 |
| 2017/0156176 | A1* | 6/2017 | Bergquist | H04W 52/0216 |
| 2017/0230160 | A1* | 8/2017 | Li | H04L 5/0048 |
| 2017/0347270 | A1* | 11/2017 | Iouchi | H04W 72/0406 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TS 36.321 V13.1.0, XP051081585, Mar. 2016, 85 pages.

PCT International Application No. PCT/KR2017/003131, Written Opinion of the International Searching Authority dated Jun. 29, 2017, 9 pages.

* cited by examiner

(a) Control-Plane Protocol Stack (b) User-Plane Protocol Stack

METHOD FOR CONFIGURING DISCONTINUOUS RECEPTION IN A COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003131, filed on Mar. 23, 2017, which claims the benefit of U.S. Provisional Application No. 62/312,478, filed on Mar. 24, 2016, the contents of which are all hereby incorporated by reference herein in their entirety.

TECHNICAL FIELD

The present invention relates to a wireless communication system and, more particularly, to a method for configuring discontinuous reception (DRX) in a wireless communication system.

BACKGROUND ART

As an example of a mobile communication system to which the present invention is applicable, a 3rd Generation Partnership Project Long Term Evolution (hereinafter, referred to as LTE) communication system is described in brief.

Figure 1:
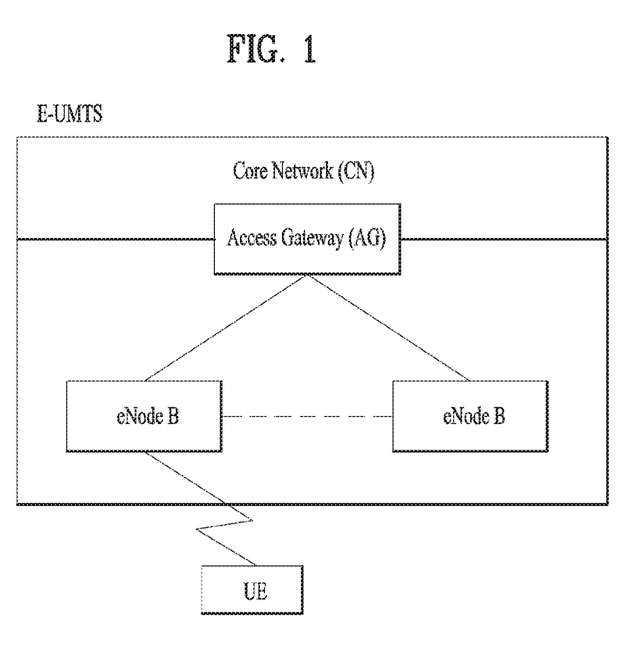
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Based on the above-mentioned discussion, methods for configuring discontinuous reception in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for a user equipment (UE) operating in a wireless communication system, the method comprising: setting a timer for downlink (DL) to a first value and a timer for uplink (UL) to a second value based on discontinuous reception (DRX) configuration information received from a base station (BS), wherein the timer for DL is used for determining DL data transmission inactivity, and the timer for UL is used for determining UL data transmission inactivity; receiving a scheduling control channel in an active time; starting or restarting the timer for DL without starting or restarting the timer for UL if the scheduling control channel indicates a new transmission in downlink; and starting or restarting the timer for UL without starting or restarting the timer for DL if the scheduling control channel indicates a new transmission in uplink.

In accordance with another aspect of the present invention, A User Equipment (UE) for operating in a wireless communication system, the UE comprising: a Radio Frequency (RF) module; and a processor operably coupled with the RF module, wherein the processor is configured to:

set a timer for downlink (DL) to a first value and a timer for uplink (UL) to a second value based on discontinuous reception (DRX) configuration information received from a base station (BS), wherein the timer for DL is used for determining DL data transmission inactivity, and the timer for UL is used for determining UL data transmission inactivity; control the RF module to receive a scheduling control channel in an active time; start or restart the timer for DL without starting or restarting the timer for UL if the scheduling control channel indicates a new transmission in downlink; and start or restart the timer for UL without starting or restarting the timer for DL if the scheduling control channel indicates a new transmission in uplink.

Preferably, the scheduling control channel is a physical downlink control channel (PDCCH).

The method further comprising: receiving, from the BS, the DRX configuration information including a first DRX configuration for UL and a second DRX configuration for DL; and configuring a first DRX cycle based on the first DRX configuration and a second DRX cycle based on the second DRX configuration.

Preferably, when the timer for DL expires, the UE starts using the second DRX cycle.

Preferably, when the timer for UL expires, the UE starts using the first DRX cycle.

Preferably, the timer for UL keeps running if the scheduling control channel indicates a new transmission in downlink.

Preferably, the timer for DL keeps running if the scheduling control channel indicates a new transmission in uplink.

It is to be understood that both the foregoing general description and the following detailed description of the present invention are exemplary and explanatory and are intended to provide further explanation of the invention as claimed.

Advantageous Effects

According to the present invention, the UE can configure discontinuous reception for each of uplink and downlink in a wireless communication system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (HDD) scheme in the present specification, the embodiments of the present invention may be easily modified and applied to a half-duplex FDD (H-FDD) scheme or a time division duplex (TDD) scheme.

Figure 2A:
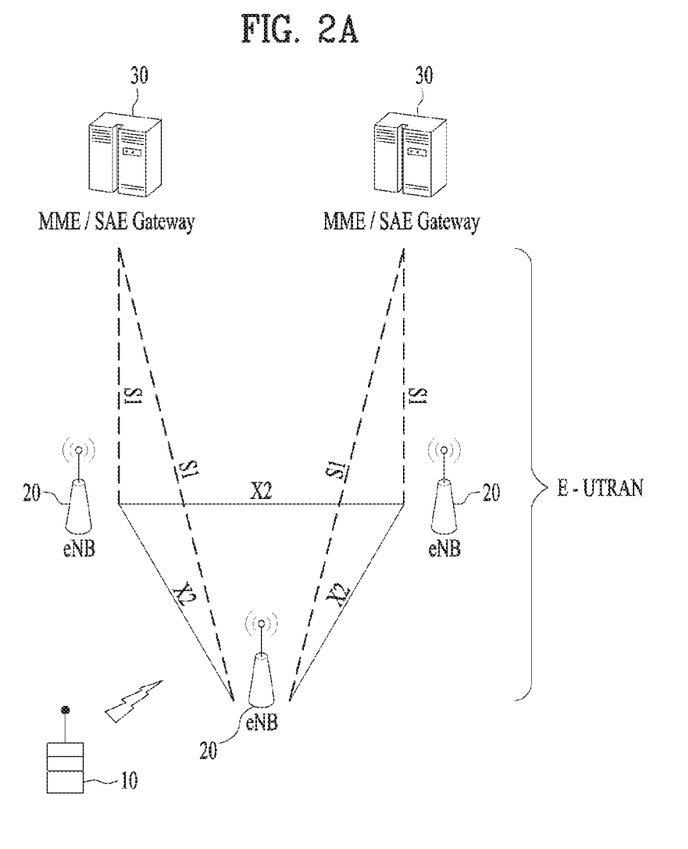
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
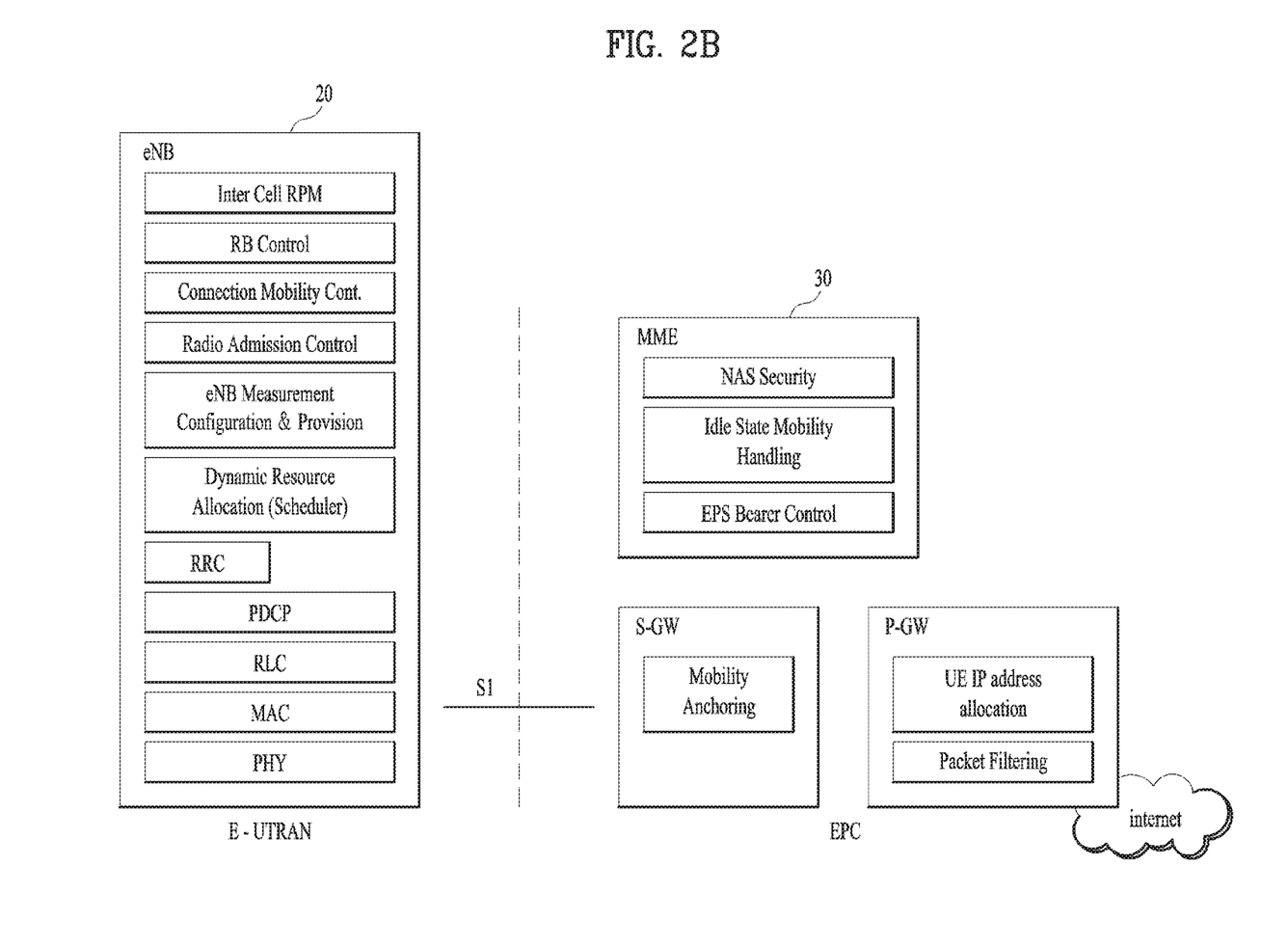
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
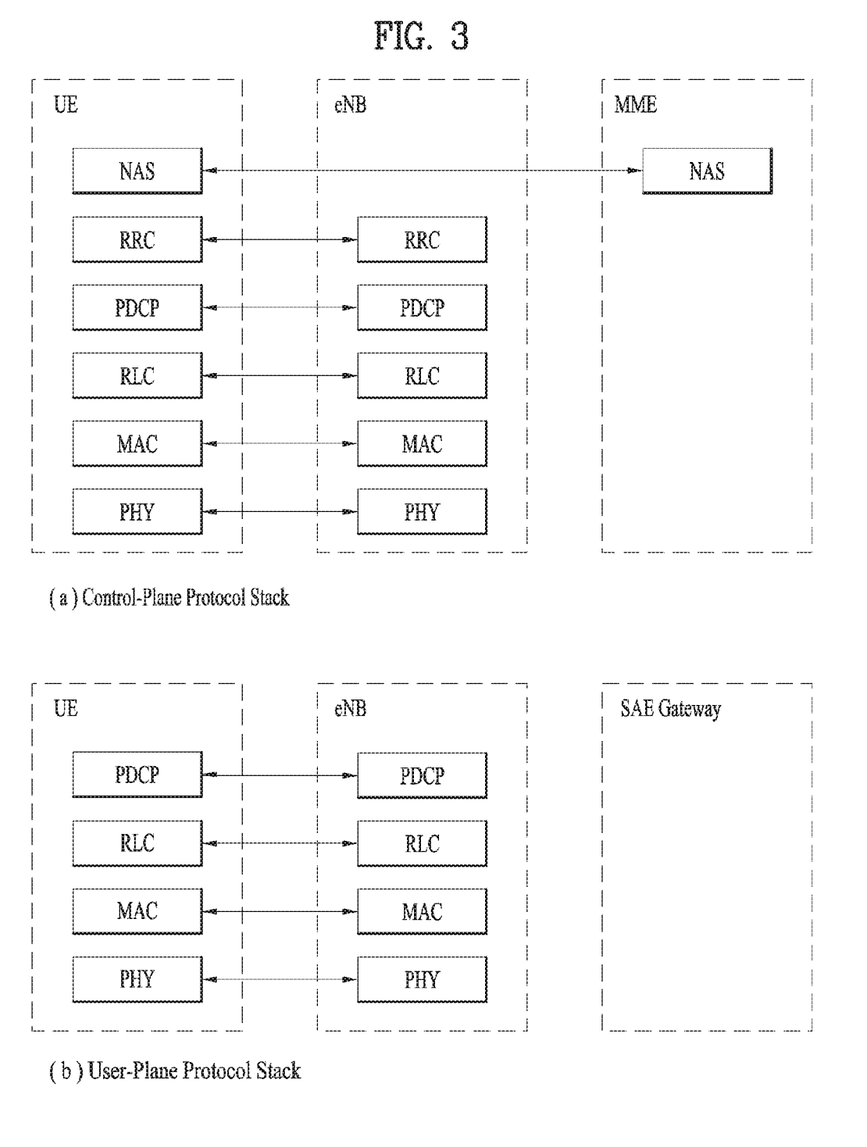
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
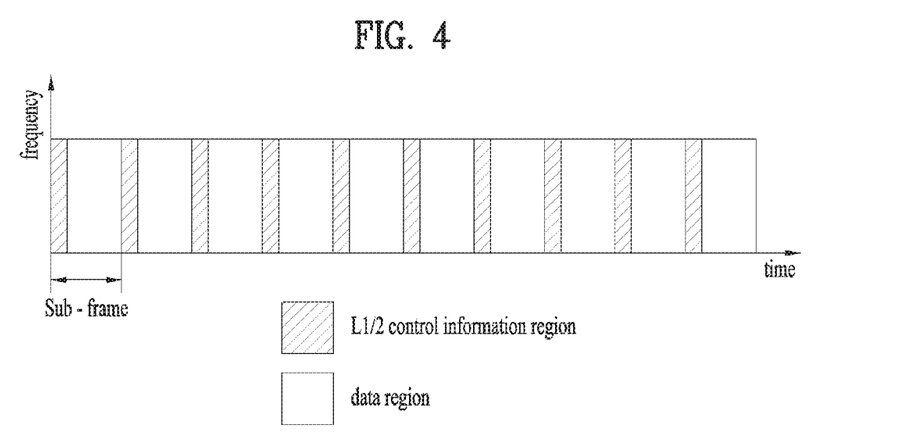
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
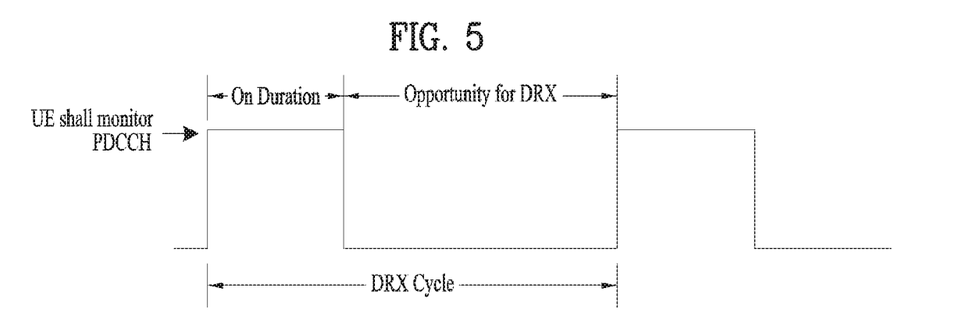
FIG. 5 is a diagram showing a concept DRX (Discontinuous Reception) operation.

FIG. 5 is a diagram showing a concept DRX (Discontinuous Reception) operation.

Referring to FIG. 5, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration?. One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE may need to additionally monitor a PDCCH during a time period other than the On Duration. That is, the UE should perform PDCCH monitoring during a time period over which an inactivity managing timer, drx-InactivityTimer or a retransmission managing timer, drx-RetransmissionTimer, On Duration managing timer, or onDurationTimer is running.

The value of each of the timers is defined as the number of subframes. The number of subframes is counted until a timer is reached to the value. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Additionally, the UE may need to perform PDCCH monitoring during random access (e.g., during mac-ContentionResolutionTimer is running) or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 6:
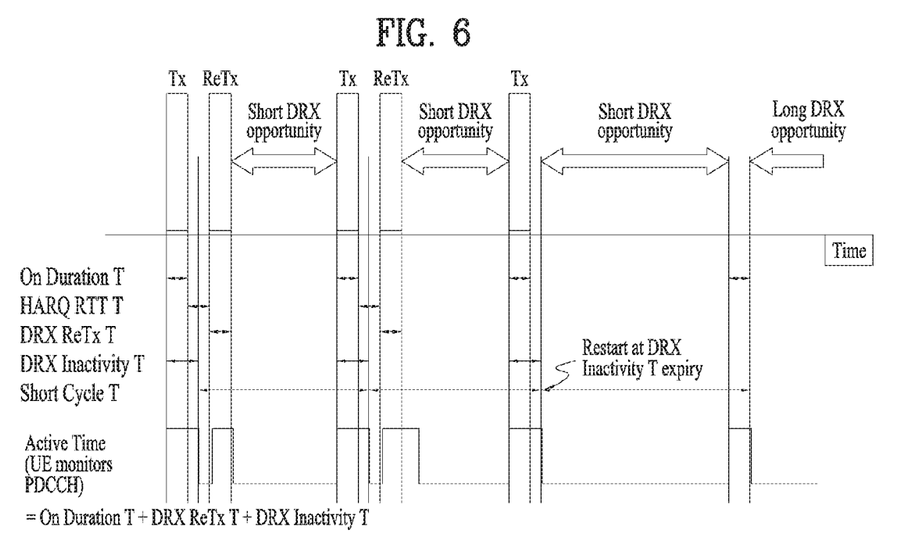
FIG. 6 is a diagram showing a method for a DRX operation in the LTE system.

FIG. 6 is a diagram showing a method for a DRX operation in the LTE system.

Referring to FIG. 6, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer (i.e., a state of no PDCCH monitoring), and use the Short DRX Cycle. However, if the Short DRX cycle is not configured, the Long DRX cycle is used. Additionally, if drxShortCycleTimer expires in this subframe, the Long DRX Cycle is also used.

In the current MAC technical specification (e.g., 3GPP TS 36.321), when DRX functionality is configured for the UE, the UE checks, in each subframe, whether to start onDurationTimer as follows:

If the Short DRX Cycle is used and [(SFN*10)+ subframe number] modulo (shortDRX-Cycle) is (drxStartOffset) modulo (shortDRX-Cycle), or If the Long DRX Cycle is used and [(SFN*10)+ subframe number] modulo (longDRX-Cycle) is drxStartOffset, the UE shall start onDurationTimer. [Equation A]

According to the equation A (so-called, modulo-DRX Cycle check), the On Duration appears once per one DRX cycle because it is assumed that the length of DRX cycle is shorter than the maximum SFN value, i.e., the maximum SFN value is currently at most 1023, and the DRX cycle is at most 2560 subframes. If the DRX cycle is set to longer than the 'maximum SFN value*10', e.g., 10230 subframes, in order to further reduce the UE's power consumption, On Duration would appear several times within one DRX cycle.

The UE shall monitor a PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL, UL, or SL) new transmission, the UE shall start or restart drx-InactivityTimer.

Meanwhile, when not in Active Time, the UE does not perform a SRS (Sounding Reference Signal) transmission and a CSI reporting, which are triggered by the eNB, and PDCCH monitoring.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

In LTE, DRX is used for UE's battery saving. Having DRX, the UE can save power during the subframes where the UE doesn't expect to receive a PDCCH for scheduling. Currently, the UE starts drx-InactivityTimer upon receiving a PDCCH indicating a new transmission in DL, UL, or SL. The basic assumption here is that the UE does not differently handle uplink and downlink scheduling. Accordingly, drx-InactivityTimer is configured to be same for UL and DL transmission by considering both of uplink and downlink traffic while uplink and downlink traffic may not always occur at the same time.

In LTE New Radio (NR) technology for 5G, UE's battery life is one of the key performance indicators. One example traffic scenario for UE's battery life extension is hundreds of bytes of uplink data transfer per day followed by tens bytes of downlink data transfer.

If the prior DRX mechanism is used for asymmetric data transfer, Active Time may be unnecessarily long based on long data transmission, e.g., DL. Otherwise, if Active Time is short based on short data transmission, e.g., UL, the UE may not be able to go to power saving mode as early as possible. Therefore, in order to save UE's power consumption by considering asymmetric amount of data transfer, a new DRX mechanism is needed.

As an embodiment, a UE may be configured to use an asymmetric DRX by a network. In asymmetric DRX operation, the UE may determine an Active Time based on different DRX configurations depending on whether the UE is scheduled in uplink or downlink. For asymmetric DRX operation, the network provides different sets of DRX parameters, one for uplink and the other one for downlink.

Figure 7:
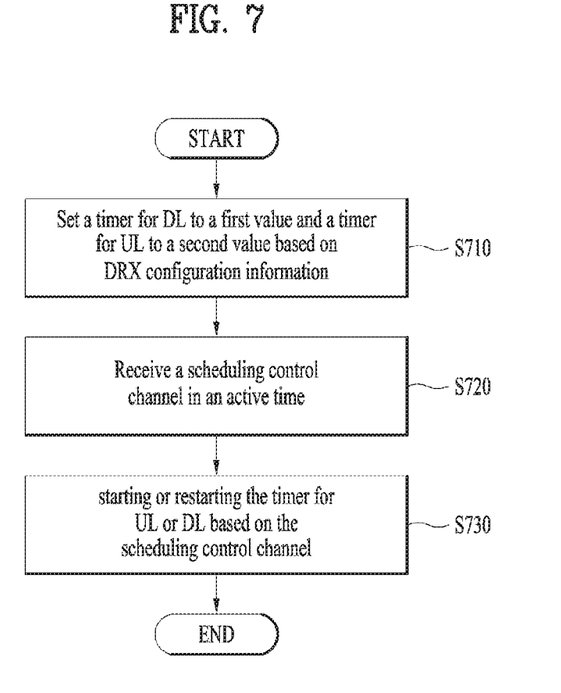
FIG. 7 is a flow diagram illustrating a method of operating a DRX inactivity timer in accordance with an embodiment of the present invention.

FIG. 7 is a flow diagram illustrating a method of operating a DRX inactivity timer in accordance with an embodiment of the present invention.

Referring to FIG. 7, the UE may set a timer for downlink to a first value and a timer for uplink to a second value based on DRX configuration information received from a base station (S710). At this, the timer for DL may be used for determining DL data transmission inactivity, and the timer for UL may be used for determining UL data transmission inactivity.

For example, if the UE receives the DRX configuration information including separate sets of DRX configuration for uplink and downlink including DRX timers and DRX parameters, the UE may set two timers used for determining data transmission inactivity (e.g. drx-InactivityTimers). In this specification, the drx-InactivityTimers for each of UL and DL may be referred to drx-ULInactivityTimer and drx-DLInactivityTimer, respectively. The drx-Inactivity-Timer may be defined as the number of consecutive PDCCH-subframe(s) after the subframe in which a PDCCH indicates an initial UL, DL or SL user data transmission for this MAC entity.

In addition, the UE may set two onDurationTimers for each of UL and DL based on the DRX configuration information. The onDurationTimer may be defined as the number of consecutive PDCCH-subframes at the beginning of a DRX Cycle. And, the onDurationTimer for each of UL and DL may be referred to ULonDurationTimer and DLon-DurationTimer, respectively.

In addition, the UE may configure two DRX cycle for each of UL and DL based on the DRX configuration information. The DRX cycle may include short DRX cycle and long DRX cycle per UL and DL. Also, the UE may set DRX short cycle timers corresponding to UL and DL based on the DRX configuration information.

Subsequently, the UE may receive a scheduling control channel in an active time (S720). The scheduling control channel may be a physical downlink control channel (PDCCH). A time period during which a UE should perform PDCCH monitoring is referred to as an Active Time. The Active Time includes On Duration during which a PDCCH is monitored periodically and a time interval during which a PDCCH is monitored upon generation of an event. More specifically, the Active Time includes the time while (1) onDuration-Timer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

In Active Time, the UE may be scheduled either in uplink or in downlink regardless of whether the Active Time is due to uplink DRX timers or downlink DRX timers. For example, the UE may receive a PDCCH for uplink scheduling while drx-DLInactivityTimer is running. Or, the UE may receive a PDCCH for downlink scheduling while drx-ULInactivityTimer is running.

If the UE receive the scheduling control channel in an active time, the UE may start or restart the timer for DL or UL based on the scheduling control channel (S730). As an example, if the scheduling control channel indicates a new transmission in uplink, the UE may start or restart the timer for UL without starting or restarting the timer for DL. In addition, if the timer for DL is running, the UE may not stop the timer for DL even though the scheduling control channel indicating the new transmission in uplink is received. On the other hand, if the scheduling control channel indicates a new transmission in downlink, the UE may start or restart the timer for DL without starting or restarting the timer for UL. In addition, if the timer for UL is running, the UE may not stop the timer for UL even though the scheduling control channel indicating the new transmission in downlink is received.

As another example, the UE may receive two DRX command MAC CEs for uplink and downlink. In other word, the DRX command MAC CE indicates whether the UE applies the DRX command to uplink or downlink. If the UE receives a DRX command MAC CE for uplink, the UE may stop the timers for UL (e.g. ULonDurationTimer and drx-ULInactivityTimer). However, the UE may not stop the timers for DL (e.g.

DLonDurationTimer and drx-DLInactivityTimer), i.e., keeps running DLonDurationTimer and drx-DLInactivityTimer. On the other hand, if the UE receives a DRX command MAC CE for downlink, the UE may stop the timers for DL (e.g. DLonDurationTimer and drx-DLInactivityTimer). However, the UE may not stop the timers for UL (e.g.

ULonDurationTimer and drx-ULInactivityTimer), i.e., keeps running ULonDurationTimer and drx-ULInactivityTimer.

Subsequently, when the timers for DL or UL expire, the UE starts using the DRX cycle. As an example, if timer for UL expires, the UE starts uses the DRX cycle for UL while the UE does not change DRX status in downlink. For example, if timer for UL (e.g. drx-ULInactivityTimer) expires while timer for DL (e.g. drx-DLInactivityTimer) is running, the UE starts to use DRX cycle, e.g., either short DRX cycle or Long DRX cycle, for uplink while the UE keeps running drx-DLInactivityTimer for downlink. As another example, if the timer for DL expires, the UE uses DRX cycle for downlink while the UE does not change DRX status in uplink. For example, if timer for DL (e.g. drx-DLInactivityTimer) expires while timer for UL (e.g. drx-ULInactivityTimer) is running, the UE starts to use DRX cycle, e.g., either short DRX cycle or Long DRX cycle, for uplink while the UE keeps running drx-DLInactivityTimer for downlink.

As another example, if the UE starts to use the short DRX cycle and if the short DRX cycle expires, the UE may start to use the Long DRX cycle. For example, if short DRX cycle for UL (e.g. ULdrxShortCycleTimer) expires, the UE may start to use Long DRX cycle for uplink. However, the UE may not change DRX status in downlink. For example, if short DRX cycle for DL (e.g. DLdrxShortCycleTimer) is running, the UE may keep using Short DRX cycle for downlink. i.e., the UE does not stop DLdrxShortCycleTimer. For another example, if short DRX cycle for DL (e.g. DLdrxShortCycleTimer) expires, the UE starts to use Long DRX cycle for downlink. However, the UE does not change DRX status in uplink. In addition, if short DRX cycle for UL (e.g. ULdrxShortCycleTimer) is running, the UE keeps using Short DRX cycle for uplink. i.e., the UE does not stop ULdrxShortCycleTimer.

Figure 8:
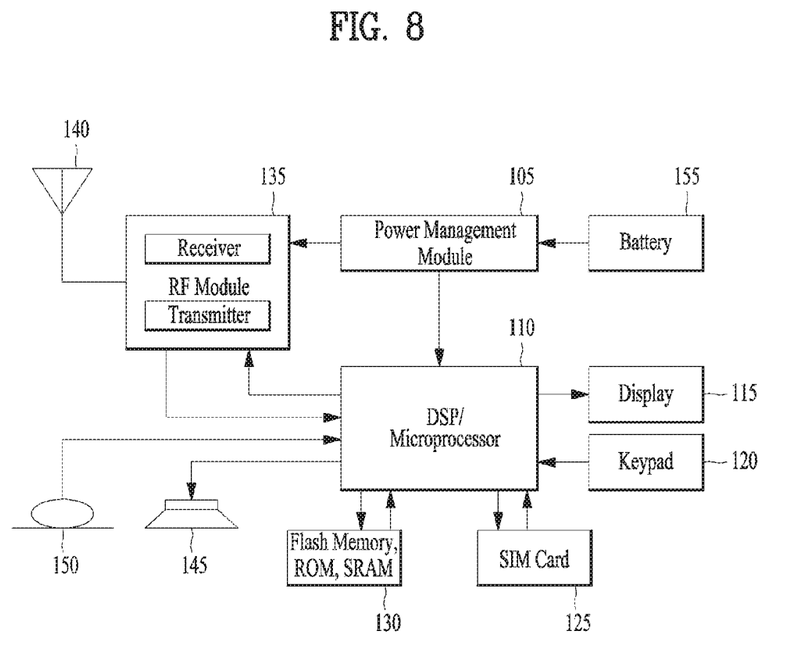
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 7.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
   setting a timer for downlink (DL) to a first value and a timer for uplink (UL) to a second value based on discontinuous reception (DRX) configuration information received from a base station (BS),
   wherein the timer for DL is used for determining DL data transmission inactivity, and the timer for UL is used for determining UL data transmission inactivity;
   receiving a scheduling control channel in an active time, the active time being a time period where the UE performs PDCCH monitoring;
   starting or restarting the timer for DL without starting or restarting the timer for UL based on that the scheduling control channel is related to a new transmission in downlink; and
   starting or restarting the timer for UL without starting or restarting the timer for DL based on that the scheduling control channel is related to a new transmission in uplink,
   wherein the DRX configuration information includes a UL DRX configuration and a DL DRX configuration,
   wherein a DRX cycle for the DL is configured based on the DL DRX configuration and a DRX cycle for the UL is configured based on the UL DRX configuration, and the DRX cycle for DL is longer than the DRX cycle for UL,
   wherein the active time is determined based on at least one of the timer for UL, the timer for DL, the DRX cycle for the DL and the DRX cycle for the UL, and
   wherein the UE is scheduled either in the uplink or in the downlink in the active time regardless of whether the active time is due to the timer for UL or the timer for DL.

2. The method according to claim 1, wherein the scheduling control channel is a physical downlink control channel (PDCCH).

3. The method according to claim 1, wherein when the timer for DL expires, the UE starts using the DRX cycle for DL.

4. The method according to claim 1, wherein when the timer for UL expires, the UE starts using the DRX cycle for UL.

5. The method according to claim 1, wherein the timer for UL keeps running regardless of the scheduling control channel related to the new transmission in downlink.

6. The method according to claim 1, wherein the timer for DL keeps running regardless of the scheduling control channel related to the new transmission in uplink.

7. A User Equipment (UE) for operating in a wireless communication system, the UE comprising:
   a Radio Frequency (RF) module; and
   a processor operably coupled with the RF module,
   wherein the processor is configured to:
   set a timer for downlink (DL) to a first value and a timer for uplink (UL) to a second value based on discontinuous reception (DRX) configuration information received from a base station (BS),
   wherein the timer for DL is used for determining DL data transmission inactivity, and the timer for UL is used for determining UL data transmission inactivity;
   control the RF module to receive a scheduling control channel in an active time, the active time being a time period where the UE performs PDCCH monitoring;
   start or restart the timer for DL without starting or restarting the timer for UL based on that the scheduling control channel is related to a new transmission in downlink; and
   start or restart the timer for UL without starting or restarting the timer for DL based on that the scheduling control channel is related to a new transmission in uplink,
   wherein the DRX configuration information includes a UL DRX configuration and a DL DRX configuration,
   wherein a DRX cycle for the DL is configured based on the DL DRX configuration and a DRX cycle for the UL is configured based on the UL DRX configuration, and the DRX cycle for DL is longer than the DRX cycle for UL,
   wherein the active time is determined based on at least one of the timer for UL, the timer for DL, the DRX cycle for the DL and the DRX cycle for the UL, and
   wherein the UE is scheduled either in the uplink or in the downlink in the active time regardless of whether the active time is due to the timer for UL or the timer for DL.

8. The UE according to claim 7, wherein the scheduling control channel is a physical downlink control channel (PDCCH).

9. The UE according to claim 7, wherein when the timer for DL expires, the UE starts using the DRX cycle for DL.

10. The UE according to claim 7, wherein when the timer for UL expires, the UE starts using the DRX cycle for UL.

11. The UE according to claim 7, wherein the timer for UL keeps running regardless of the scheduling control channel related to the new transmission in downlink.

12. The UE according to claim 7, wherein the timer for DL keeps running regardless of the scheduling control channel related to the new transmission in uplink.

* * * * *